(12) United States Patent
Tsai et al.

(10) Patent No.: US 11,807,710 B2
(45) Date of Patent: Nov. 7, 2023

(54) UV-CURABLE RESINS USED FOR CHEMICAL MECHANICAL POLISHING PADS

(71) Applicant: CMC Materials, Inc., Aurora, IL (US)

(72) Inventors: Chen-Chih Tsai, Naperville, IL (US); Eric S. Moyer, Aurora, IL (US); Ping Huang, Naperville, IL (US)

(73) Assignee: CMC Materials, Inc., Aurora, IL (US)

( * ) Notice: Subject to any disclaimer, the term of this patent is extended or adjusted under 35 U.S.C. 154(b) by 0 days.

(21) Appl. No.: 17/503,422

(22) Filed: Oct. 18, 2021

(65) Prior Publication Data

US 2022/0119586 A1    Apr. 21, 2022

Related U.S. Application Data

(60) Provisional application No. 63/093,543, filed on Oct. 19, 2020.

(51) Int. Cl.
| | | |
|---|---|---|
| *C08G 18/81* | (2006.01) | |
| *C08F 2/48* | (2006.01) | |
| *C08G 18/67* | (2006.01) | |
| *C08K 3/04* | (2006.01) | |
| *C08G 18/10* | (2006.01) | |
| *B24B 37/24* | (2012.01) | |

(52) U.S. Cl.
CPC .......... *C08G 18/8116* (2013.01); *B24B 37/24* (2013.01); *C08F 2/48* (2013.01); *C08G 18/10* (2013.01); *C08G 18/6725* (2013.01); *C08K 3/04* (2013.01)

(58) Field of Classification Search
CPC .. C08K 3/04; C08G 18/8116; C08G 18/7621; C08G 18/6725; C08G 18/672; C08G 18/48; C08G 18/10; C08F 2/50; C08F 2/48; B42B 37/24
See application file for complete search history.

(56) References Cited

U.S. PATENT DOCUMENTS

| 5,965,460 | A | * | 10/1999 | Rach | C08G 18/672 |
| | | | | | 451/526 |
| 8,512,427 | B2 | * | 8/2013 | Xie | C08G 18/7621 |
| | | | | | 451/526 |
| 9,676,963 | B2 | | 6/2017 | Rolland et al. | |
| 2013/0012108 | A1 | | 1/2013 | Li et al. | |
| 2019/0144713 | A1 | * | 5/2019 | Gadinski | C08G 18/758 |
| | | | | | 106/6 |
| 2020/0157265 | A1 | * | 5/2020 | Ganapathiappan | C09D 11/101 |

(Continued)

FOREIGN PATENT DOCUMENTS

| KR | 2018049565 A | * | 5/2018 | ............. B24B 37/24 |
| KR | 1020180049565 A | | 5/2018 | |
| WO | WO-2011087737 A2 | * | 7/2011 | ............... B24D 3/28 |

OTHER PUBLICATIONS

Korean Intellectual Property Office as ISA, International Search Report and Written Opinion issued in connection with PCT/US2021/055344 dated Feb. 3, 2022.

*Primary Examiner* — Sanza L. McClendon

(57) ABSTRACT

The invention provides a UV-curable resin for forming a chemical-mechanical polishing pad comprising: (a) one or more acrylate blocked isocyanates; (b) one or more acrylate monomers; and (c) a photoinitiator. The invention also provides a method of forming a chemical-mechanical polishing pad using the UV-curable resin.

18 Claims, 7 Drawing Sheets

(56) References Cited

U.S. PATENT DOCUMENTS

| 2020/0247932 A1* | 8/2020 | Share | C08L 75/16 |
| 2021/0069860 A1* | 3/2021 | Chaudhari | C08G 18/4833 |
| 2022/0363957 A1* | 11/2022 | Kumar | B32B 27/308 |

* cited by examiner

UV-CURABLE RESINS USED FOR CHEMICAL MECHANICAL POLISHING PADS

BACKGROUND OF THE INVENTION

An integrated circuit is typically formed on a substrate by the sequential deposition of conductive, semi-conductive, and/or insulative layers on a silicon wafer. A variety of fabrication processes require planarization of at least one of these layers on the substrate. For example, for certain applications (e.g., polishing of a metal layer to form vias, plugs, and lines in the trenches of a patterned layer), an overlying layer is planarized until the top surface of a patterned layer is exposed. In other applications (e.g., planarization of a dielectric layer for photolithography), an overlying layer is polished until a desired thickness remains over the underlying layer. Chemical-mechanical planarization, also known as chemical-mechanical polishing (both referred to as "CMP"), is one accepted method of planarization. This planarization method typically requires that the substrate be mounted on a carrier head. The exposed surface of the substrate is typically placed against a polishing pad on a rotating platen. The carrier head provides a controllable load (e.g., a downward force) on the substrate to push it against the rotating polishing pad. A polishing liquid, such as slurry with abrasive particles, can also be disposed on the surface of the polishing pad during polishing.

One objective of a CMP process is to achieve a high polishing uniformity. If different areas on the substrate are polished at different rates, then it is possible for some areas of the substrate to have too much material removed ("overpolishing") or too little material removed ("underpolishing"). Conventional polishing pads, including standard pads and fixed-abrasive pads, can suffer from these problems. A standard pad may have a polyurethane polishing layer with a roughened surface and may also include a compressible backing layer. A fixed abrasive pad has abrasive particles held in a containment media and is typically supported on an incompressible backing layer.

These conventional polishing pads are typically prepared by molding, casting or sintering polyurethane materials. Molded polishing pads must be prepared one at a time (e.g., by injection molding). For casting polishing pads, a liquid precursor is cast and cured into a "cake," which is subsequently sliced into individual pad sections. These pad sections must then be machined to a final thickness. Polishing pads prepared using conventional extrusion-based processes generally lack desirable properties for CMP (e.g., are too brittle for effective CMP).

CMP pads can also be formed using a vat-based additive manufacturing process, as described in U.S. patent application Ser. No. 16/868,965, wherein a plurality of thin layers of pad material are progressively formed. Each layer of the plurality of layers may be formed via UV-initiated reaction of a precursor material to form a thin layer of solidified pad material. The resulting pad is thus formed with a precisely controlled structure by projecting an appropriate pattern of light (e.g., UV irradiation) for forming each thin layer.

The additive manufacturing process provides for various benefits and advantages. For example, one advantage of the additive manufacturing process is the ability to generate a CMP pad comprising a continuous single-layer body, in contrast to the multi-layered body formed by extrusion-based CMP processes (which require a top-sheet adhered to a sub-pad via adhesives). Additionally, the additive manufacturing process enables polishing pads to be formed with more tightly controlled physical and chemical properties than is possible using other conventional processes. For example, the process allows CMP pads to be prepared with unique groove and channel structures depending on the UV light image projected on the surface. The patterns on the layers can be applied by a computer aided design (CAD) program that controls the projected UV image pattern. The process also facilitates increased manufacturing throughput than is possible using other methods, including extrusion-based printing processes (e.g., processes involving a mechanical printhead with nozzles that eject precursor material onto a surface as the printhead is moved). The additive manufacturing process also reduces machine operation costs, material costs and labor costs, while also reducing the likelihood of human error.

Forming a CMP pad using the additive manufacturing process has typically involved a dual (two-step) curing process that comprises UV curing and thermal curing of a resin, wherein the resin is typically formed of the following mixture: a UV-curable (meth)acrylate blocked polyurethane (ABPU), a reactive diluent, a photoinitiator, and at least one chain extender. The reactive diluent is an acrylate or methacrylate that helps to reduce the viscosity of ABPU and will be copolymerized with the ABPU under UV irradiation. The chain extenders can be diols, diamines, triols, triamines, or any combination thereof. In the first step, the resin is subjected to UV curing, i.e., a low-temperature, high-speed process by which ultraviolet light is used to initiate a photochemical reaction that generates a crosslinked network of polymers, resulting in a more hardened or cured resin. The UV curing forms an intermediate shaped product having blocked polyurethane oligomers as a scaffold. In the second step, the ABPU resin, carrying the chain extender, is subjected to thermal curing and a high molecular weight polyurethane/polyurea is formed by the spontaneous reaction between the polyurethane/polyurea oligomers and the chain extender(s).

DETAILED DESCRIPTION

Figure 1A:
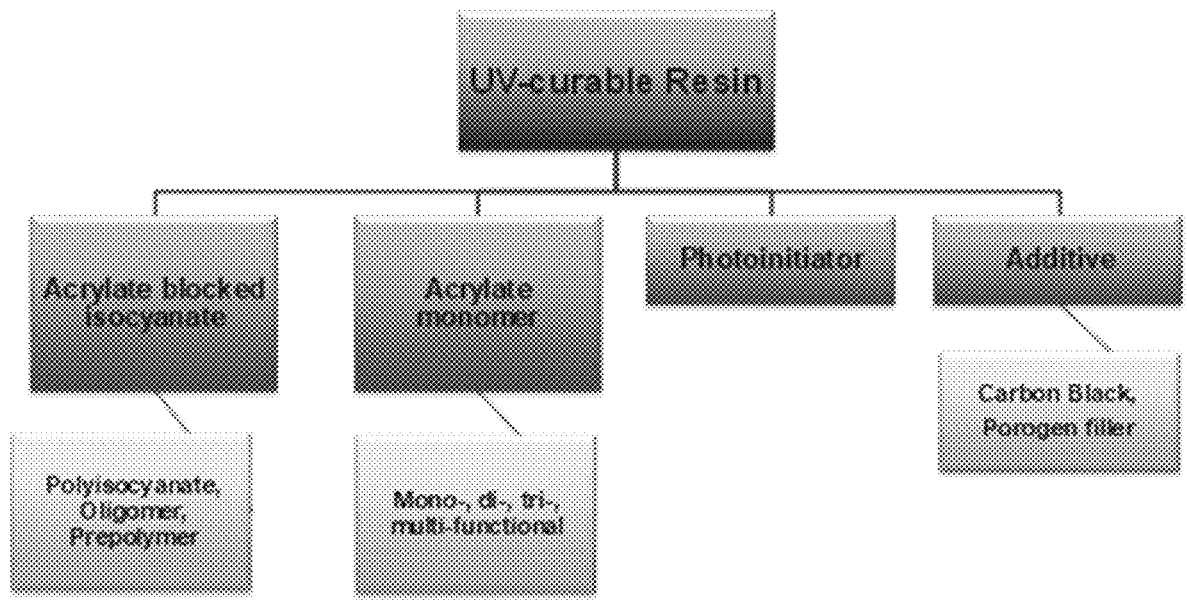
FIG. 1A illustrates a UV-curable resin for forming chemical mechanical polishing pads, in accordance with the present disclosure.

It should be understood at the outset that, although example implementations of embodiments of the disclosure are illustrated below, the present disclosure may be implemented using any number of techniques, whether currently known or not. The present disclosure should in no way be limited to the example implementations, drawings, and techniques illustrated below. Additionally, the drawings are not necessarily drawn to scale.

An integrated circuit is typically formed on a substrate by the sequential deposition of conductive, semi-conductive, and/or insulative layers on a silicon wafer. A variety of fabrication processes require planarization of at least one of these layers on the substrate. For example, for certain applications (e.g., polishing of a metal layer to form vias, plugs, and lines in the trenches of a patterned layer), an overlying layer is planarized until the top surface of a patterned layer is exposed. In other applications (e.g., planarization of a dielectric layer for photolithography), an overlying layer is polished until a desired thickness remains over the underlying layer. Chemical-mechanical planarization, also known as chemical-mechanical polishing (both referred to as "CMP"), is one accepted method of planarization. This planarization method typically requires that the substrate be mounted on a carrier head. The exposed surface of the substrate is typically placed against a polishing pad on a rotating platen. The carrier head provides a controllable load (e.g., a downward force) on the substrate to push it against the rotating polishing pad. A polishing liquid, such as slurry with abrasive particles, can also be disposed on the surface of the polishing pad during polishing.

One objective of a CMP process is to achieve a high polishing uniformity. If different areas on the substrate are polished at different rates, then it is possible for some areas of the substrate to have too much material removed ("over-polishing") or too little material removed ("underpolishing"). Conventional polishing pads, including standard pads and fixed-abrasive pads, can suffer from these problems. A standard pad may have a polyurethane polishing layer with a roughened surface and may also include a compressible backing layer. A fixed abrasive pad has abrasive particles held in a containment media and is typically supported on an incompressible backing layer.

These conventional polishing pads are typically prepared by molding, casting or sintering polyurethane materials. Molded polishing pads must be prepared one at a time (e.g., by injection molding). For casting polishing pads, a liquid precursor is cast and cured into a "cake," which is subsequently sliced into individual pad sections. These pad sections must then be machined to a final thickness. Polishing pads prepared using conventional extrusion-based processes generally lack desirable properties for CMP (e.g., are too brittle for effective CMP).

CMP pads can also be formed using a vat-based additive manufacturing process, as described in U.S. patent application Ser. No. 16/868,965, wherein a plurality of thin layers of pad material are progressively formed. Each layer of the plurality of layers may be formed via UV-initiated reaction of a precursor material to form a thin layer of solidified pad material. The resulting pad is thus formed with a precisely controlled structure by projecting an appropriate pattern of light (e.g., UV irradiation) for forming each thin layer.

The additive manufacturing process provides for various benefits and advantages. For example, one advantage of the additive manufacturing process is the ability to generate a CMP pad comprising a continuous single-layer body, in contrast to the multi-layered body formed by extrusion-based CMP processes (which require a top-sheet adhered to a sub-pad via adhesives). Additionally, the additive manufacturing process enables polishing pads to be formed with more tightly controlled physical and chemical properties than is possible using other conventional processes. For example, the process allows CMP pads to be prepared with unique groove and channel structures depending on the UV light image projected on the surface. The patterns on the layers can be applied by a computer aided design (CAD) program that controls the projected UV image pattern. The process also facilitates increased manufacturing throughput than is possible using other methods, including extrusion-based printing processes (e.g., processes involving a mechanical printhead with nozzles that eject precursor material onto a surface as the printhead is moved). The additive manufacturing process also reduces machine operation costs, material costs and labor costs, while also reducing the likelihood of human error.

Forming a CMP pad using the additive manufacturing process has typically involved a dual (two-step) curing process that comprises UV curing and thermal curing of a resin, wherein the resin is typically formed of the following mixture: a UV-curable (meth)acrylate blocked polyurethane (ABPU), a reactive diluent, a photoinitiator, and at least one chain extender. The reactive diluent is an acrylate or methacrylate that helps to reduce the viscosity of ABPU and will be copolymerized with the ABPU under UV irradiation. The chain extenders can be diols, diamines, triols, triamines, or any combination thereof. In the first step, the resin is subjected to UV curing, i.e., a low-temperature, high-speed process by which ultraviolet light is used to initiate a photochemical reaction that generates a crosslinked network of polymers, resulting in a more hardened or cured resin. The UV curing forms an intermediate shaped product having blocked polyurethane oligomers as a scaffold. In the second step, the ABPU resin, carrying the chain extender, is subjected to thermal curing and a high molecular weight polyurethane/polyurea is formed by the spontaneous reaction between the polyurethane/polyurea oligomers and the chain extender(s).

The present disclosure seeks to improve upon existing CMP processes by forming an improved CMP pad made of a UV-curable resin and formed by a vat-based additive manufacturing process. In particular, the present disclosure is directed to a CMP pad made of a UV-curable resin that omits the (amine) chain extender(s), modifies the ratio of capped polymers used for the resin, and eliminates the second thermal curing step in the vat-based additive manufacturing process. The result is a CMP pad having improved chemical and mechanical properties and that provides advantages such as high removal rates and increased planarization efficiency, while reducing manufacturing costs and resources.

UV-Curable Resin for Forming a CMP Pad

FIG. 1A illustrates an exemplary UV-curable resin formulation for making a CMP pad. The UV-curable resin is composed of a mixture comprising the following: one or more acrylate blocked isocyanates (e.g., acrylate urethane oligomers), one or more acrylate monomers, a photoinitiator (e.g., photo-polymerization initiator), and one or more additives. Each of these elements will be described in turn.

As shown in FIG. 1A, the acrylate blocked isocyanates (acrylate urethane oligomers) can be selected from polyisocyanates or isocyanate-terminated urethane prepolymers. The free isocyanates are reacted with hydroxyl or amine-terminated acrylates to form the acrylate urethane oligomers. Specifically, acrylate blocked isocyanates comprise acrylate blocking agents such as 2-hydroxyethyl acrylate (HEA), 2-hydroxyethyl methacrylate (HEMA), 2-(tert-butylamino) ethyl methacrylate (TBEMA), and 3-(acryloyloxy)-2-hydroxypropyl methacrylate (AHPMA) etc., with isocyanate-terminated urethane prepolymers, such as aromatic prepolymers (e.g., PET95A, PET75D, both commercially available from Coim USA, Inc., 80DPLF, available commercially from Anderson Development Company, Adrian, Mi.), and aliphatic prepolymers (e.g., APC722, APC504, 51-95A, etc., also available commercially from Coim USA, Inc., West Deptford, N.J.). It is to be noted that, in an embodiment, the ratio of particular capped polymers of the acrylate blocked isocyanate component used in UV-curable resin, in conjunction with the other described aspects of the present disclosure, improves the removal rate and planarization efficiency of the resulting CMP pad. For example, in an embodiment, a preferred ratio of TBEMA to HEA in the acrylate blocked isocyanate of the UV-curable resin is 75:25.

Next, acrylate monomers serve as reactive diluents to reduce the viscosity of the UV-curable resin. As used herein, the term acrylate can refer to methacrylates and acrylates. Acrylate monomers may be mono-functional, di-functional, tri-functional, or multi-functional monomers. For example, the acrylate monomers can include isobornyl methacrylate (IBMA), 2-carboxyethyl acrylate (CEA), 2-hydroxyethyl acrylate (HEA), ethylene glycol dimethacrylate (EGDMA), neopentyl glycol dimethacrylate (NGDMA), 3-(acryloyloxy)-2-hydroxypropyl methacrylate (AHPMA), trimethylolpropane triacrylate (TMPTA), etc.

Next, a photoinitiator is used to initiate the polymerization reaction in regions exposed to light (e.g., UV irradiation). The photoinitiator can be set at 365 nm or 405 nm, depending on the selected UV LED wavelength. For example, diphenylphosphine oxide (TPO) can be used as the photoinitiator, which may be irradiated by 365 nm UV LED light.

Finally, additives may be added to the UV-curable resin and may include stabilizers, plasticizers, porogen fillers and/or pigments, e.g., carbon black, etc. Porogens are particles (e.g., microspheres) which expand in volume when heated. Porogens may cause the formation of pores in the polishing pad, which may improve pad performance. In an embodiment, Expancel microspheres, such as 031DU40, 461DU20, and 920DU40 (commercially available from Nouryon), can be used as porogen fillers to create a porous structure in the polymer matrix. Another additive which may be used in the UV-curable resin is carbon black, a substance for adding color to the formed CMP pad.

Notably, as shown in FIG. 1A, the UV-curable resin mixture of the present disclosure does not include amino chain extender(s), which may be required in conventional resins used for manufacturing CMP pads. The elimination of the thermal curing step in the present invention eliminates the requirement for an amino chain extender. In particular, as chain extenders are useful in the thermal curing process (i.e., the thermal curing step is providing thermal energy for free isocyanates which are deblocked from acrylate urethane oligomers to react with amino chain extender), the present method omits the thermal cure step, and thus eliminates the need of chain extenders.

Method of Forming a CMP Pad

Figure 1B:
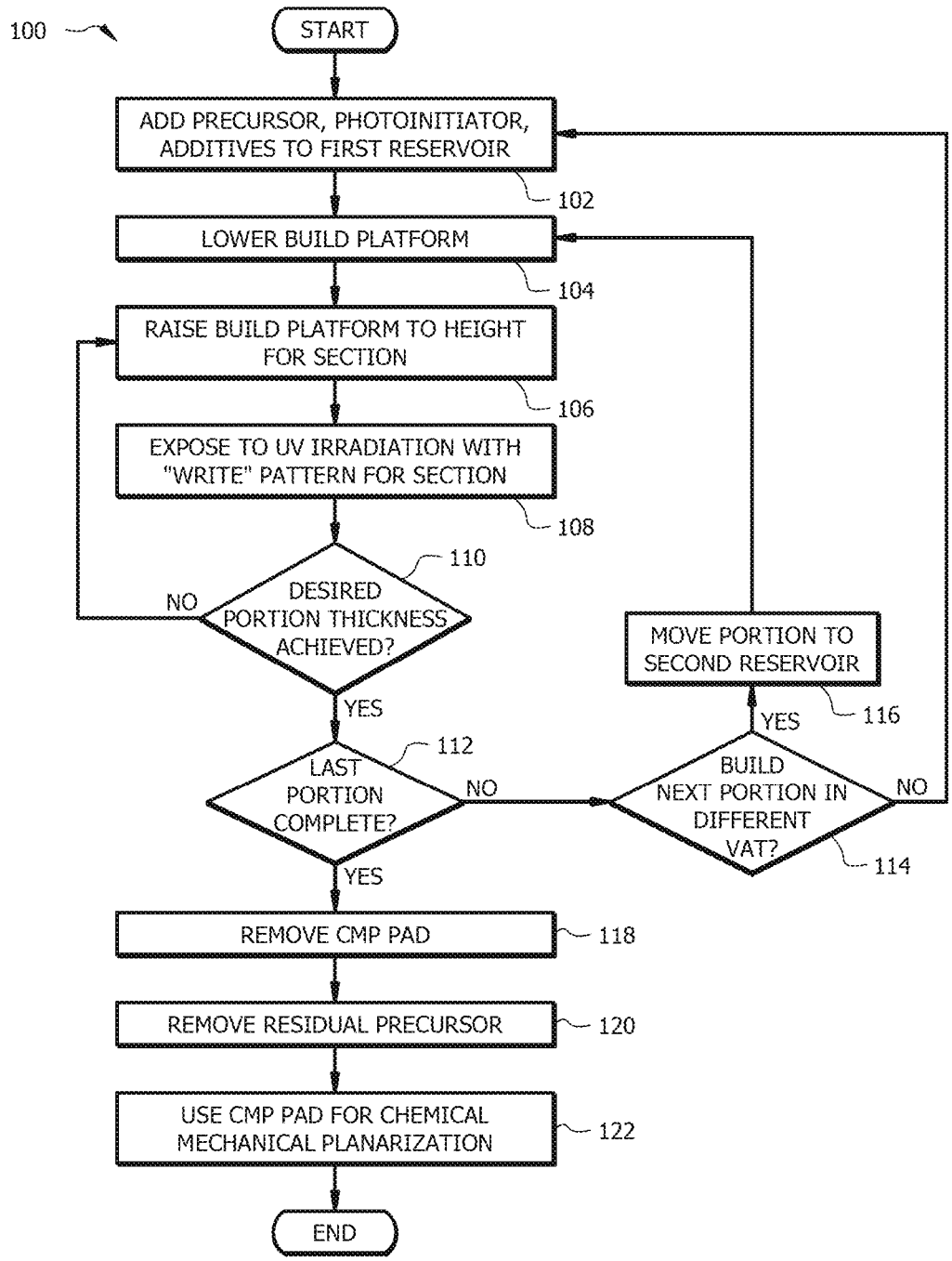
FIG. 1B illustrates a method for forming a chemical mechanical polishing pad using a UV-curable resin, in accordance with the present disclosure.

FIG. 1B illustrates an example process 100 for preparing a CMP pad using the UV-curable resin described in FIG. 1A. In this example, a plurality of thin layers of pad material are progressively formed using a vat-based additive manufacturing process. Each layer of the plurality of layers may be formed via UV-initiated reaction of a precursor material to form a thin layer of solidified pad material. The resulting pad is thus formed with a precisely controlled structure by projecting an appropriate pattern of light (e.g., UV irradiation) for forming each thin layer. Using process 100, CMP polishing pads can be formed with more tightly controlled physical and chemical properties than is possible using conventional processes. For example, using process 100, CMP pads can be prepared with unique groove and channel structures. Process 100 also facilitates increased manufacturing throughput than is possible using conventional methods, including extrusion-based printing processes (e.g., processes involving a mechanical printhead with nozzles that eject precursor material onto a surface as the printhead is moved).

As shown in FIG. 1B, at step 102, a UV-curable resin comprising one or more precursors, a photoinitiator, and/or any additives (including, e.g., a porogen filler), as described in conjunction with FIG. 1A, are added to a vat or reservoir of an additive manufacturing apparatus. The precursor is generally a liquid and, in accordance with the present disclosure, may include an acrylate blocked isocyanate (acrylate urethane oligomers) and an acrylate monomer. As described above in conjunction with FIG. 1A, the acrylate blocked isocyanate may be selected from polyisocyanates or isocyanate-terminated urethane prepolymers. The free isocyanates are reacted with hydroxyl or amine-terminated acrylates to form the acrylate urethane oligomers. Specifically, as described above, acrylate blocked isocyanates comprise acrylate blocking agents such as HEA, HEMA, TBEMA, AHPMA, etc., with isocyanate-terminated urethane prepolymers, such as aromatic prepolymers, and aliphatic prepolymers. In an embodiment, and as described above, the ratios of certain capped polymers may be set to improve the planarization efficiency and removal rate of the CMP pad formed of the UV-curable resin, and may further facilitate the elimination of a thermal curing step. For example, in an embodiment, a preferred ratio of TBEMA to HEA in the acrylate blocked isocyanate of the UV-curable resin may be 75:25.

Next, the acrylate monomers may be mono-functional, di-functional, tri-functional, or multi-functional monomers. For example, the acrylate monomers can include IBMA, CEA, HEA, EGDMA, NGDMA, AHPMA, TMPTA, etc.

The UV-curable resin may further include a photoinitiator for initiating this polymerization reaction in regions exposed to light (e.g., UV irradiation). The photoinitiator can be set at 365 nm or 405 nm, depending on the selected UV LED wavelength. The precursor mixture may also include a crosslinking agent such as an isocyanate compound.

To adjust the properties of the polishing pad, the UV-curable resin may be combined with one or more additives. Suitable additives include, but are not limited to, urethane monomers, urethane oligomers, amines polyurethane with desired mechanical properties for the polishing pad. Another additive may include carbon black, for adding color to the formed CMP pad. As described above, in some embodiments, one or more porogens may be included in the vat or reservoir in order to form pores in the polishing pad. The porogen is typically added at a weight percentage of between 1% to 30%. However, the porogen may be added at a lower or higher concentration as appropriate for a given application.

The UV-curable resin mixture of the present disclosure eliminates the need for amino chain extender(s) typically required in resins used for CMP. The elimination of the amino chain extender in turn obviates the necessity for thermal curing, as described in step 118 below.

At step 104 of example method 100, a build platform of the additive manufacturing apparatus is lowered into a thin film of the precursor material until it is close to or touching the bottom of the precursor-filled vat. At step 106, the build platform is moved upward to the desired height for the first layer of the pad. The height may be on the scale of about 5, 10, 15, 20, 25, 50, 100 or micrometers (or greater when appropriate). Overall, a thickness of each layer of the plurality of layers may be less than 50% of a total thickness of the polishing pad or the polishing layer of the pad. A thickness of each layer of the plurality of layers may be less than 1% of a total thickness of the polishing pad or the polishing layer of the pad.

At step 108, which may be performed simultaneously with step 106, a light source is used to "write" the structure of the first layer of the pad. For example, UV light may pass through a window at the bottom of the vat that is substantially transparent to the UV light (i.e., sufficiently transparent to UV light such that the intensity of the UV light can initiate a photoinitiated reaction of the precursor). In an example case where the process 100 employs continuous liquid interface production, UV light passes through a "dead zone" (i.e., the thin liquid film of uncured precursor between the window and the build platform where dissolved oxygen levels inhibit the free radical reaction) and is projected in a predetermined pattern (i.e., a "write" pattern) for achieving a desired structure for the layer (e.g., with an appropriately patterned structure, as described above). In general, the regions of the precursor that are exposed to the UV light (i.e., based on a "write" pattern) under appropriate reaction conditions are radically polymerized. Photo-radical polymerization occurs after exposure to the UV light. Photo-radical polymerization may proceed continuously as the build platform is raised. For example, photo-radical polymerization may occur after exposure to the UV light. Using process 100, a CMP pad can be produced with the buried grooves and/or channels. The patterns of grooves and channels may be controlled by the pattern of the UV light projected on each layer of precursor during step 108. These patterns can be controlled by a CAD program that is used to design the pattern of the projected UV light.

At step 110, a determination (e.g., by a controller or processor of the apparatus) is made of whether a desired pad thickness has been achieved (e.g., that a desired number of layers of the precursor has been photo-radically polymerized). If the desired thickness is not reached, the process returns to step 106 and the build platform is moved upward again to the desired height of the second layer, which may be the same as or different than the height of the first layer. As the build platform is moved upward, uncured precursor flows beneath the cured layer. In some embodiments, the process pauses to allow an appropriate volume of precursor to flow (e.g., determined by the diameter of the polishing pad being manufactured and the viscosity of the precursor). Steps 108 and 110 are then repeated to write and cure the second layer of the polishing pad which may include the same or a different structure (e.g., of grooves and/or channels) than the first layer. Steps 106 through 110 are repeated until a desired thickness of the polishing pad or of a portion (e.g., the backing portion or polishing portion) of the pad is achieved.

Once the desired thickness is achieved, the process 100 proceeds to step 112. At step 112, a determination is made (e.g., by an individual or by a processor of the additive manufacturing apparatus) of whether the entire polishing pad is complete. For example, in the preceding steps, only the backing portion of the pad may have been prepared. In such a case, it is determined that the final portion of the pad is not complete (i.e., because the polishing portion still needs to be prepared). If the final portion of the pad is complete, the process 100 proceeds to step 118 (described below). However, if the final portion of the pad is not complete, the process 100 proceeds to step 114.

At step 114, a determination is made of whether the next portion of the pad (e.g., the polishing portion) should be prepared in the same vat or in a different vat. For example, if the polishing portion is to be prepared using the same mixture of precursor(s), porogen(s), and/or additive(s) that was introduced at step 102, then the polishing portion is to be prepared in the same vat. If the next portion of the pad is to be prepared in the same vat, the process 100 may return to step 102 such that the next portion (e.g., the polishing portion) of the pad is prepared. However, if the next portion of the pad is not to be prepared in the same vat, the process 100 may proceed to step 116 where the pad is moved to a second reservoir or vat. For example, the pad (or the portion prepared at this stage of the process 100) may be removed from the vat of the first additive manufacturing apparatus and moved to the vat of a second additive manufacturing apparatus. The vat of the second additive manufacturing apparatus may be filled with the appropriate combination of precursor(s), porogen(s), and/or additive(s) for achieving desired properties of the next portion (e.g., the polishing portion) of the pad. The process 100 may then repeat from step 104 to prepare the next portion (e.g., the polishing portion) of the pad.

Once the desired pad thickness is achieved (step 110) and the final pad portion is complete (step 112), the process proceeds to step 118. At step 118, the pad is removed from the build platform. Importantly, the pad is removed from the build platform without the need for any additional thermal curing. As described above, this eliminates the need of the amino chain extender.

At step 120, the pad may be rinsed to remove residual precursor, porogens, and/or additives. In some embodiments, the pad is only rinsed with a mild solvent or water to prevent damage to the pad. In some embodiments, the pad is not rinsed at step 114. In some embodiments, portions of the CMP pad may be backfilled with a second material. At step 122, the CMP pad is used for chemical mechanical planarization.

In general, the width of the polishing pads described herein is not limited to the size of the reservoir or vat used for their preparation. During production, precursor must be continuously replenished in the region beneath the pad that is being prepared. Polishing pads are typically 20-30 inches in diameter and sometimes only about 1/16th of an inch thick, and more time is required to replenish the dead zone for a large-diameter polishing pad. One embodiment of the process described herein provides a solution to this problem by facilitating the production of the polishing pad in a fluted, or folded, manner. In this embodiment, the pad is constructed such that it resembles a fluted filter paper (i.e., a circular piece of paper folded in an accordion-like fashion). Thus, the polishing pad can be manufactured in a conical shape with folded sides, such that, while the constructed pad remains pliable enough to be manipulated (e.g., before it is fully cured), the conical structure can be unfolded to achieve the desired circular or disk-like shape of the polishing pad.

EXPERIMENTAL EXAMPLES

A series of exemplary CMP pads were prepared from UV-curable resins and using the additive manufacturing process, as described in FIGS. 1A and 1B above. The properties of the exemplary pads were tested for tensility and stability.

Figure 2:
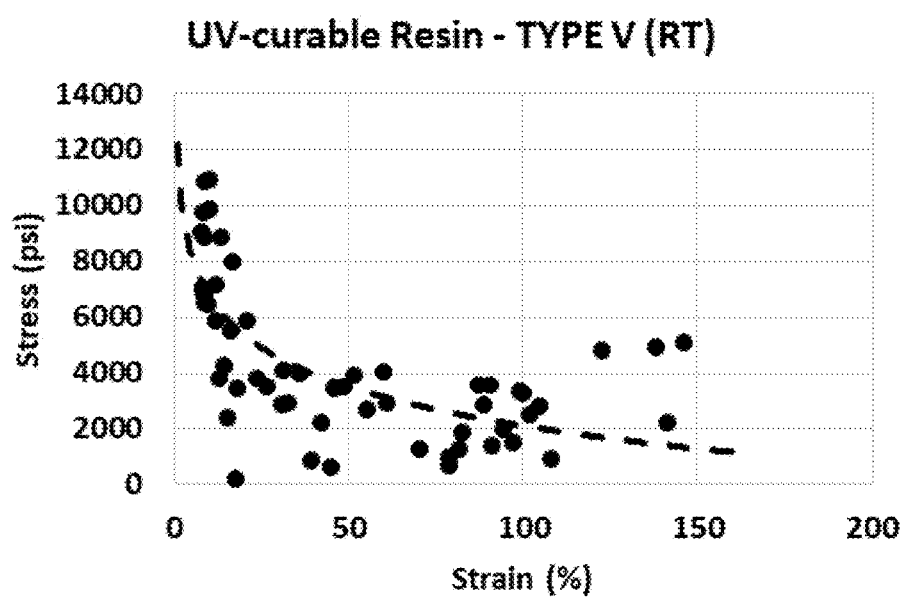
FIG. 2 illustrates a plot showing the tensile properties of example UV-curable resins, in accordance with the present disclosure.

Reference is now made to FIG. 2, which illustrates a plot showing the tensile properties of example UV-curable resins formed using the components described in conjunction with FIG. 1A. In particular, the samples of FIG. 2 were tested under American Society for Testing and Materials (ASTM) D638, a standard testing method designed to produce tensile property data for plastics and other materials. Type V tensile bars were used for testing. As shown in the plot, the resin formulation of the present disclosure may allow for the formation of materials having a broad range of properties, from very stiff to very soft.

Figure 3A:
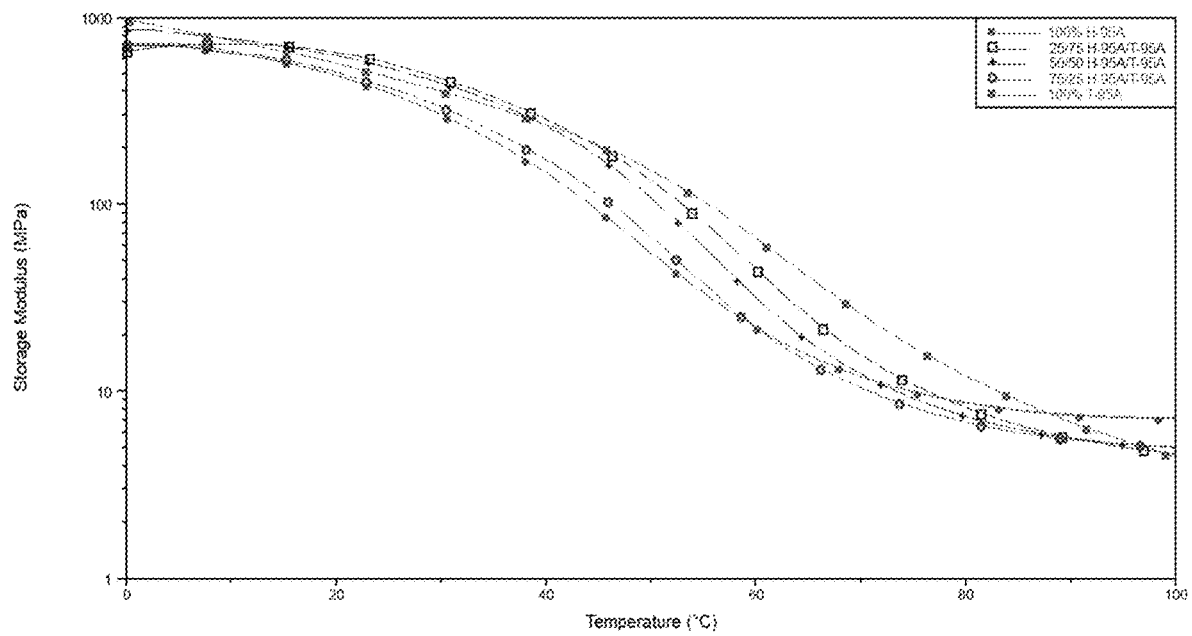
FIG. 3A illustrates a plot showing the stability of example UV-curable resins as a function of storage modulus versus temperature, in accordance with the present disclosure.
Figure 3B:
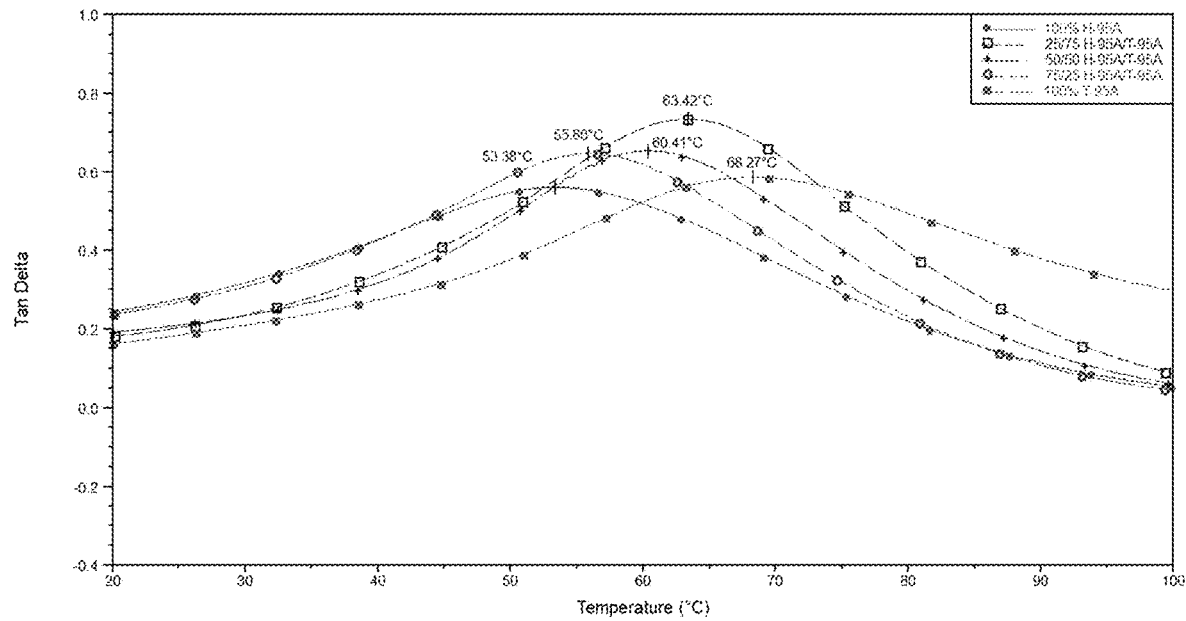
FIG. 3B illustrates a plot showing the stability of example UV-curable resins as a function of glass transition temperature versus temperature, in accordance with the present disclosure.

Reference is now made to FIGS. 3A and 3B, which illustrate plots showing the stability (based on storage modulus and glass transition temperature, respectively) of example UV-curable resins formed using the components described in FIG. 1A. Specifically, the UV-curable resin samples of FIGS. 3A and 3B were formed from two reactive diluents (namely two di-functional oligomers) and various ratios of two prepolymers, a HEA capped PET95A prepolymer (a permanent acrylate referred to in FIGS. 3A-3B and hereafter as "H-95A") and a TBEMA capped PET95A prepolymer (a heat labile capped isocyanate prepolymer referred to in FIGS. 3A-3B and hereafter as "T-95A"). Five ratios were sampled: 1) 100% H-95A (H-95A:T-95A at 100:0); 2) 25% H-95A and 75% T-95A (H-95A:T-95A at 25:75); 3) 50% H-95A and 50% T-95A (H-95A:T-95A at 50:50); 4) 75% H-95A and 25% T-95A (H-95A:T-95A at 75:25); and 5) 100% T-95A (H-95A:T-95A at 0:100). As shown in the graphs of FIGS. 3A-3B, the storage modulus and the glass transition temperature (Tan Delta peak) can be adjusted by tuning the ratio of the two prepolymers (H-95A and T-95A). Specifically, both the storage modulus at 50° C. (which is a typical polishing temperature) increases as the ratio of the T-95A prepolymer in the polymer matrix increases. Likewise, the glass transition temperature also increases as the ratio of the T-95A prepolymer increases. This is further shown in the plots of FIG. 3B and corresponding Table 1 (below). In an embodiment, the preferred H-95A:T-95A ratio is 25:75 (i.e., 75% T-95A and 25% H-95A).

TABLE 1

Data extracted from FIG. 3B

| H-95A:T-95A Ratio | Glass Transition Temperature (° C.) |
|---|---|
| H-95A:T-95A at 100:0 (100% H-95A) | 53.4 |
| H-95A:T-95A at 25:75 | 55.9 |
| H-95A:T-95A at 50:50 | 60.4 |
| H-95A:T-95A at 75:25 | 63.4 |
| H-95A:T-95A at 0:100 (100% T-95A) | 68.3 |

With continued reference to FIGS. 3A-3B, the UV curing process was not modified to produce these results. Moreover, unlike traditional molding processes that require tuning to match each formulation's physical properties (e.g., viscosity, reaction kinetics, etc.), the sample UV-curable resins processed through the additive manufacturing process provide the advantage of readily customizing pad properties to meet specific requirements in a short timeframe. Additionally, it is shown that the resin formulations remain stable at room temperature when stored in UV protection containers without exposure to UV light.

With reference now to FIGS. 4A-6C, a series of exemplary CMP pads were prepared from a UV-curable resin and using the additive manufacturing process, as described in FIGS. 1A and 1B above. It is understood that in the bulk oxide step of polishing for both shallow trench isolation (STI) and inner layer dielectric (ILD) CMP processes, high removal rate and planarization efficiency are considered to be two of the most important factors in measuring CMP success. The specific formulation of the UV-curable resin used for the exemplary pads of FIGS. 4A-6C consists of 49 parts of TBEMA capped PET95A prepolymer (a heat labile capped isocyanate prepolymer), 16 parts of HEA capped PET95A prepolymer (a permanent acrylate), 33 parts of IBMA, 2 parts of EGDMA, and 0.3 parts of TPO as the photoinitiator. In order to produce pores in the polymer matrix, 3.5% of 031DU40 porogen fillers were added to this formulation upon UV curing. The resin then went through a thermal treatment process to foam the porogen fillers in the UV-cured polymer matrix. As described above, it is shown that the 75:25 ratio of the TBEMA capped prepolymer to the HEA capped prepolymer is notably critical to achieving the results shown in FIGS. 4A-6C. For example, pads made by the same process, but using a 50:50 ratio of the TBEMA capped prepolymer to the HEA capped prepolymer, showed a comparable removal rate, but did not show the improvement in planarization efficiency as exemplified in FIGS. 4B and 4C for the 75:25 ratio, under identical conditions (data not shown).

The exemplary pads were tested against commercial pads that were formed using conventional molding processes and/or other resins, and the removal rates and/or planarization efficiencies of each were measured. The results are described below.

Figure 4A:
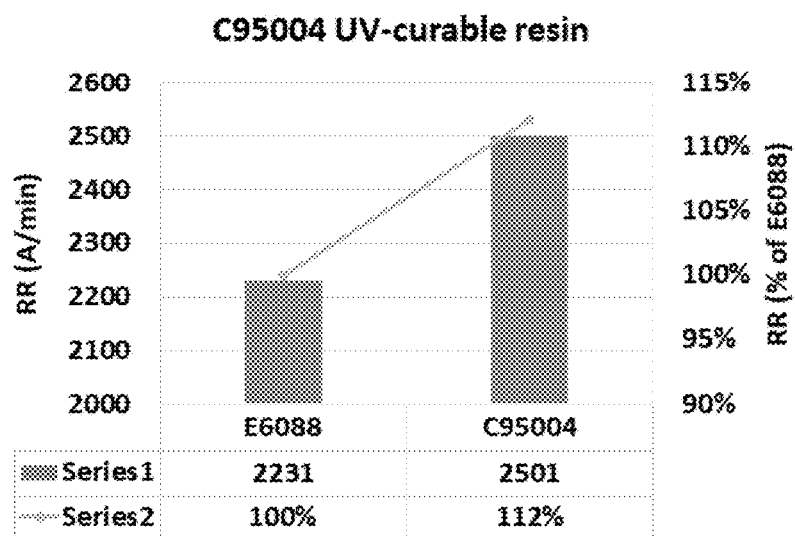
FIG. 4A illustrates a comparative graph showing the removal rates of a chemical mechanical polishing pad made of a UV-curable resin and formed by an additive manufacturing process using a dielectric slurry versus a chemical mechanical polishing pad formed by a molding process, in accordance with the present disclosure.
Figure 4B:
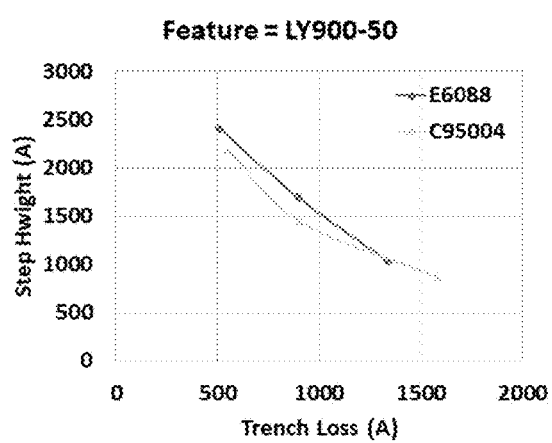
FIG. 4B illustrates a comparative graph showing the planarization efficiencies of a chemical mechanical polishing pad made of a UV-curable resin and formed by an additive manufacturing process using a dielectric slurry versus a chemical mechanical polishing pad formed by a molding process, in accordance with the present disclosure.
Figure 4C:
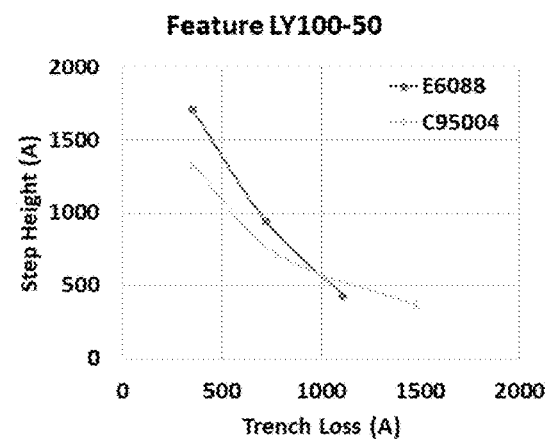
FIG. 4C illustrates a comparative graph showing planarization efficiencies of a chemical mechanical polishing pad made of a UV-curable resin and formed by an additive manufacturing process using a dielectric slurry versus a chemical mechanical polishing pad formed by a molding process, in accordance with the present disclosure.

FIGS. 4A-4C illustrate comparative graphs showing removal rates and planarization efficiencies of a CMP pad made of a UV-curable resin and formed by an additive manufacturing process in accordance with the present disclosure (the pad is referred to in FIGS. 4A-4C as "C95004" and referred to hereafter as the "exemplary pad"), as compared to a commercial CMP pad, E6088 available from CMC Materials Inc. (the pad is referred to in FIGS. 4A-4C as "E6088" and referred to hereafter as the "conventional pad"). Both pads were used to polish test silicon oxide blanket, and pattern, wafers using a silica-based dielectric slurry (D9228, commercially available from Cabot Microelectronics Corporation). FIG. 4A shows the removal rate results, in angstroms per minute, using the exemplary pad and the conventional pad. FIG. 4B shows planarization efficiency for polishing a test wafer with a 900 μm feature, and FIG. 4C shows the same for exemplary pad and the conventional pad polishing a test wafer with a 100 μm feature.

As shown in FIG. 4A, the exemplary pad presented more than a 10% increase in removal rate as compared to the conventional pad using a dielectric slurry under a 3 psi down force. The STI 10k pattern wafer performance was also evaluated to determine step height reduction versus trench loss (planarization efficiency), and as shown in FIG. 4B and FIG. 4C, the exemplary pad yielded a greater planarization efficiency than the conventional pad. Moreover, feature size did not significantly impact planarization efficiency of the exemplary pad. These results show that the exemplary pad made from UV-curable resin may present comparable or improved polishing performance in a bulk oxide polishing application over a pad from conventional technologies.

Figure 5:
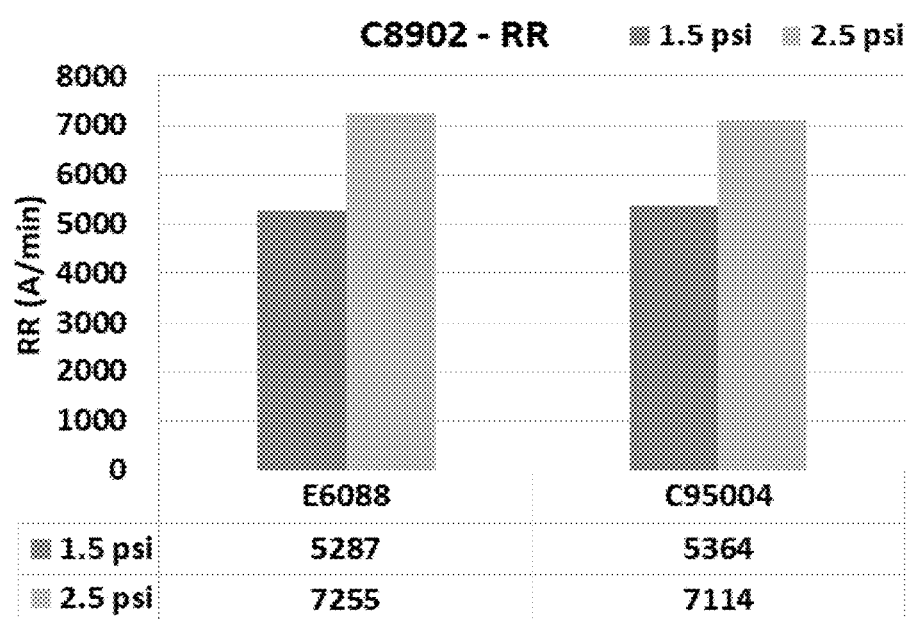
FIG. 5 illustrates a comparative graph showing the removal rates of a chemical mechanical polishing pad made of a UV-curable resin and formed by an additive manufacturing process using a copper slurry versus a chemical mechanical polishing pad formed by a molding process, in accordance with the present disclosure.

FIG. 5 illustrates a comparative graph showing the removal rates of the exemplary and the conventional pad described above, when polishing copper test wafer. Both pads were used to polish the test wafers using a copper slurry (C8902, commercially available from Cabot Microelectronics Corporation). As shown in FIG. 5, the exemplary pad performed substantially similar to the conventional pad under identical conditions, at both 1.5 psi and 2.5 psi down forces.

Figure 6A:
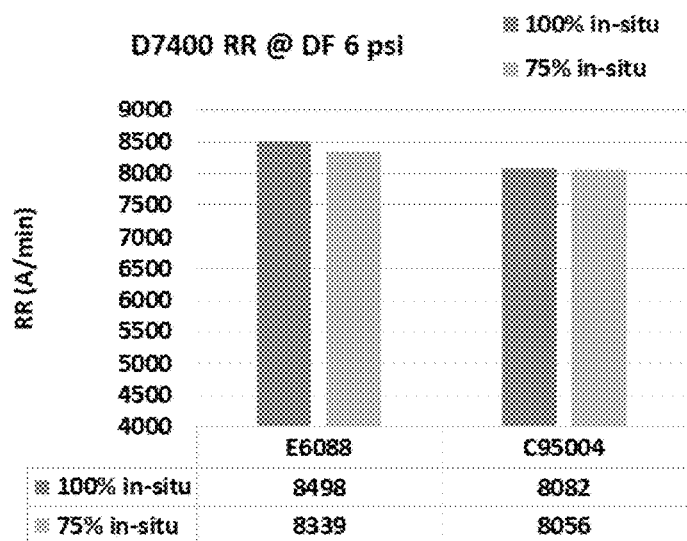
FIG. 6A illustrates a comparative graph showing the removal rates of a chemical mechanical polishing pad made of a UV-curable resin and formed by an additive manufacturing process using a cerium oxide slurry versus a chemical mechanical polishing pad formed by a molding process, in accordance with the present disclosure.
Figure 6B:
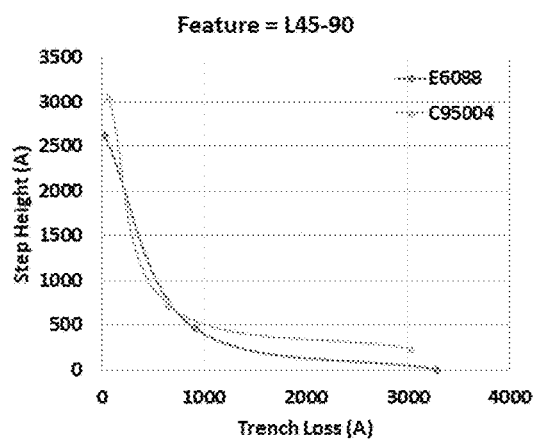
FIG. 6B illustrates a comparative graph showing the planarization efficiencies of a chemical mechanical polishing pad made of a UV-curable resin and formed by an additive manufacturing process using a cerium oxide slurry versus a chemical mechanical polishing pad formed by a molding process, in accordance with the present disclosure.
Figure 6C:
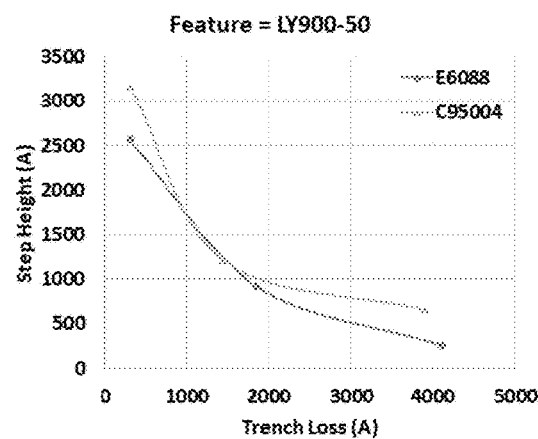
FIG. 6C illustrates a comparative graph showing the planarization efficiencies of a chemical mechanical polishing pad made of a UV-curable resin and formed by an additive manufacturing process using a ceria slurry versus a chemical mechanical polishing pad formed by a molding process, in accordance with the present disclosure.

FIGS. 6A-6C illustrate comparative graphs showing the removal rates and planarization efficiencies of the exemplary and the conventional pad described above. Both pads were used to polish test silicon oxide wafers using a ceria-based bulk silicon oxide polishing slurry (D7400, commercially available from Cabot Microelectronics Corporation). The effect of conditioning on the performance of the pads was also evaluated.

As shown in FIG. 6A, even in high oxide rate polishing, the performance of the exemplary pad was substantially similar to that of the conventional pad under a down force of 3.0 psi. It is also noted here that the exemplary pad is not significantly influenced by conditioner recipe, and shows no change in removal when the 100% in-situ conditioning falls to 75% in-situ conditioning, while the conventional pad shows a slight reduction in removal rate when reduced to 75% in-situ conditioning. Although conditioner decay has been shown to affect the polishing performance of a CMP pad in terms of removal rate stability and pad life (e.g., in certain tungsten (W) slurries, it has been shown that the conditioner decay impacts the ability to maintaining a stable tungsten removal rate), it is expected that the exemplary pad will maintain removal rate even when the conditioner decays.

As discussed above, for high oxide bulk polishing, the planarization efficiency is critical to achieving step height reduction. The STI 10k pattern was also used to evaluate the exemplary pad pattern performance. As shown in FIG. 6B and FIG. 6C, the exemplary pad shows comparable planarization efficiency performance compared with the conventional pad in both the small feature 45 μm (FIG. 6B) or the big feature 900 μm (FIG. 6C), which indicates that polishing performance from the exemplary pads made from UV-curable resin of the present disclosure is not significantly dependent on feature size. This is a great advantage in that CMP pads may be broadly fit with various wafer designs.

As a comparative example, pads made by the identical vat-based additive manufacturing procedure using dual cure resin mixtures and adding the additional process step of a thermal cure including the amine chain extenders described previously. Comparative pads were made using three different dual cure resin mixtures. The dual cure resins used to make the Comparative A, Comparative B and Comparative C pads were FPU50, RPU60, and RPU70, (purchased from Carbon Inc.) respectively. The three comparative pads were then used to polish test silicon oxide blanket and pattern wafers, with conditions as described above for FIGS. 4A-4C. As it can be clearly seen in Table 2 the comparative pads had a much lower removal rate (RR) for the blanket wafers using the D9228 slurry under 3 psi down force (less than 80% blanket RR of the conventional pad, E6088). Because of the low removal rate demonstrated by the comparative pads, they displayed worse performance for planarization efficiency (PE). For example, the step height was more than two times higher than that of conventional pad E6088 at the identical trench loss value of 500 angstroms (data not shown).

TABLE 2

Removal Rates for Comparable Pads

| Pad | Removal Rate (angstroms/minute) |
|---|---|
| Conventional-E6088 | 2305 |
| Comparative A | 1859 |
| Comparative B | 1813 |
| Comparative C | 1897 |

In sum, the UV-curable resins of the present disclosure and the CMP pads formed therefrom show improved or comparable polishing performance over conventional pads formed by molding processes in various slurries. It is believed that the disclosed exemplary pads made from UV-curable resins of the present disclosure, when formed by the additive manufacturing process described above, may eliminate expensive and time-consuming molds, as required in molding or casting processes. The exemplary pads made from the UV-curable resins of the present disclosure may be designed to meet a wide range of specifications, and thus improve upon the efficiencies of the additive manufacturing process by furthering CMP goals of high removal rates and planarization efficiencies across different substrate materials.

Modifications, additions, or omissions may be made to the systems, apparatuses, and methods described herein. The components of the systems and apparatuses may be integrated or separated. Moreover, the operations of the systems and apparatuses may be performed by more, fewer, or other components. The methods may include more, fewer, or other steps. Additionally, steps may be performed in any suitable order. Additionally, operations of the systems and apparatuses may be performed using any suitable logic. As used in this document, "each" refers to each member of a set or each member of a subset of a set.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. The use of any and all examples, or exemplary language (e.g., "such as") provided herein, is intended merely to better explain the disclosure and does not pose a limitation on the scope of claims.

The invention claimed is:

1. A UV-curable resin for forming a chemical-mechanical polishing pad comprising:
   (a) an acrylate blocked isocyanate component, wherein the acrylate blocked isocyanate component comprises an acrylate blocking agent and an isocyanate terminated urethane prepolymer, wherein the acrylate blocking agents are selected from 2-hydroxyethyl acrylate (HEA), 2-hydroxyethyl methacrylate (HEMA), 2-(tert-butylamino) ethyl methacrylate (TBEMA), and 3-(acryloyloxy)-2-hydroxypropyl methacrylate (AHPMA), wherein the acrylate blocking agent and the isocyanate terminated urethane prepolymer form a capped prepolymer, and wherein there is a ratio of particular capped prepolymers in the acrylate blocked isocyanate component;
   (b) one or more acrylate monomers; and
   (c) a photoinitiator.

2. The UV-curable resin of claim 1, wherein the acrylate blocked isocyanate component comprises polyisocyanates.

3. The UV-curable resin of claim 1, wherein the isocyanate-terminated urethane prepolymers comprise aromatic prepolymers, aliphatic prepolymers, or combinations thereof.

4. The UV-curable resin of claim 1, wherein the acrylate blocking agents forming the capped prepolymers are 2-(tert-butylamino) ethyl methacrylate and 2-hydroxyethyl acrylate.

5. The UV-curable resin of claim 4, wherein the ratio of 2-(tert-butylamino) ethyl methacrylate capped prepolymers: 2-hydroxyethyl acrylate capped prepolymers is greater than 50:50.

6. The UV-curable resin of claim 5, wherein the ratio of 2-(tert-butylamino) ethyl methacrylate capped prepolymers: 2-hydroxyethyl acrylate capped prepolymers is 75:25.

7. The UV-curable resin of claim 1, wherein the one or more acrylate monomers are selected from isobornyl methacrylate (IBMA), 2-carboxyethyl acrylate (CEA), 2-hydroxyethyl acrylate (HEA), ethylene glycol dimethacrylate (EGDMA), neopentyl glycol dimethacrylate (NGDMA), 3-(acryloyloxy)-2-hydroxypropyl methacrylate (AHPMA) and trimethylolpropane triacrylate (TMPTA).

8. The UV-curable resin of claim 1, wherein the photoinitiator is diphenylphosphine oxide (TPO).

9. The UV-curable resin of claim 1 further comprising an additive selected from stabilizers, plasticizers, porogen fillers, pigments and combinations thereof.

10. A chemical-mechanical polishing pad comprising polymerized material formed from polymerization of the UV-curable resin of claim 1.

11. A method of forming a polishing pad comprising:
   (a) preparing a UV-curable resin comprising:
      (i) an acrylate blocked isocyanate component, wherein the acrylate blocked isocyanate component comprises an acrylate blocking agent and an isocyanate terminated urethane prepolymer, wherein the acrylate blocking agents are selected from 2-hydroxyethyl acrylate (HEA), 2-hydroxyethyl methacrylate (HEMA), 2-(tert-butylamino) ethyl methacrylate (TBEMA), and 3-(acryloyloxy)-2-hydroxypropyl methacrylate (AHPMA), wherein the acrylate blocking agent and the isocyanate terminated urethane prepolymer form a capped prepolymer, and wherein there is a ratio of particular capped prepolymers in the acrylate blocked isocyanate component;
      (ii) one or more acrylate monomers, and
      (iii) a photoinitiator;
   (b) exposing a thin layer of the UV-curable resin to UV light, initiating a polymerization reaction, and thus forming a thin layer of solidified pad material;
   wherein the method does not include a thermal curing step.

12. The method of claim 11, wherein the isocyanate-terminated urethane prepolymers comprise aromatic prepolymers, aliphatic prepolymers, or combinations thereof.

13. The method of claim 11, wherein the acrylate blocking agents forming the capped prepolymers are 2-(tert-butylamino) ethyl methacrylate and 2-hydroxyethyl acrylate.

14. The method of claim 13, wherein the ratio of 2-(tert-butylamino) ethyl methacrylate capped prepolymers: 2-hydroxyethyl acrylate capped prepolymers is greater than 50:50.

15. The method of claim 14, wherein the ratio of 2-(tert-butylamino) ethyl methacrylate capped prepolymers: 2-hydroxyethyl acrylate capped prepolymers is 75:25.

16. The method of claim 11, wherein the one or more acrylate monomers are selected from isobornyl methacrylate (IBMA), 2-carboxyethyl acrylate (CEA), 2-hydroxyethyl acrylate (HEA), ethylene glycol dimethacrylate (EGDMA), neopentyl glycol dimethacrylate (NGDMA), 3-(acryloyloxy)-2-hydroxypropyl methacrylate (AHPMA) and trimethylolpropane triacrylate (TMPTA).

17. The method of claim 11, wherein he photoinitiator is diphenylphosphine oxide (TPO).

18. The method of claim 11, further comprising an additive selected from stabilizers, plasticizers, porogen fillers, pigments and combinations thereof.

\* \* \* \* \*